United States Patent

[11] 3,604,304

| [72] | Inventor | Harry A. Botting<br>Long Beach, Calif. |
|---|---|---|
| [21] | Appl. No. | 869,664 |
| [22] | Filed | Oct. 27, 1969 |
| [45] | Patented | Sept. 14, 1971 |
| [73] | Assignee | The United States of America as represented by the Secretary of the Army and/or the Administrator of the Federal Aviation Administration |

[54] DUCT JOINT PIN
1 Claim, 2 Drawing Figs.

[52] U.S. Cl. ................................................. 85/3 R, 24/211 P
[51] Int. Cl. ..................................................... F16b 21/00
[50] Field of Search ........................................... 85/3, 3 S, 3 K, 5 E, 5 M, 81, 5 CP; 24/211 P, 211, 212

[56] References Cited
UNITED STATES PATENTS

| 911,292 | 2/1909 | Call | 85/3 UX |
|---|---|---|---|
| 1,974,966 | 9/1934 | McClure | 85/3 |
| 2,132,284 | 10/1938 | Bonham | 85/3 S |
| 2,472,569 | 6/1949 | Caldwell et al. | 85/3 UX |

*Primary Examiner*—Ramon S. Britts
*Attorneys*—Alva H. Bandy, William G. Gapcynski and Lawrence A. Neureither ABSTRACT: A duct joint pin for joining apertured metal sheets or the like and for sealing the apertures of the metal sheets. The pin has a latch pivotally mounted on one end, a tubular body, and a flange on the end opposite the latch with a depending sealing O-ring. A pair of levers extend from heads located outside the tubular body through the tubular body to ends adapted to engage the latch selectively to position the latch in either substantial alignment with the tubular body for insertion in or removal of the pin from the apertured metal sheets, or in a locking position transverse to the tubular body of the pin. The locking of the latch retains the sealing O-ring depending from the flange of the tubular body in sealing engagement with the apertured metal sheets. A sealing ring is positioned in the tubular body of the pin to surround the levers and seal off the area between the levers and the inside of the tubular body.

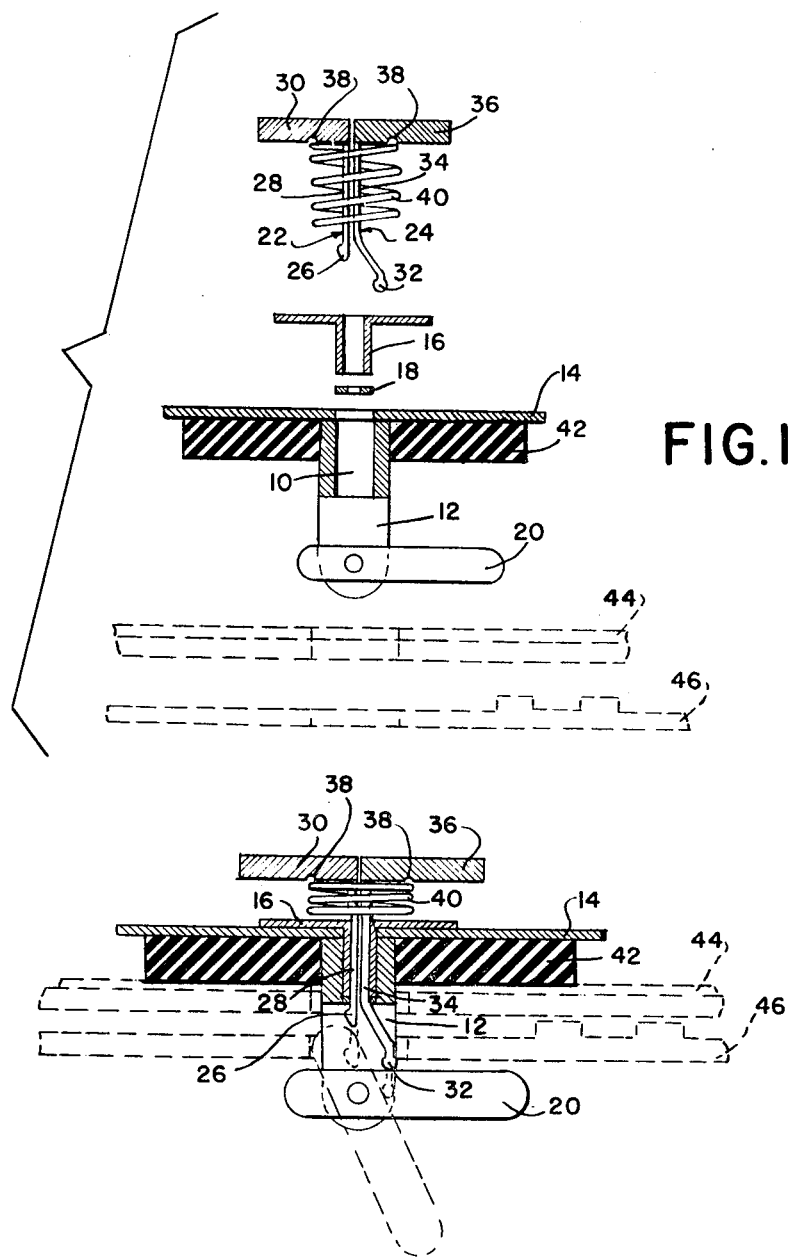

3,604,304

1

DUCT JOINT PIN

BACKGROUND OF THE INVENTION

1. Field of the Invention

This invention relates to pin-type fastening devices for clamping together two or more apertured sheet members such as plates used in duct work and for sealing the apertures of the plates.

2. Description of the Prior Art

Heretofore, pins having latch locking members have been simple action type devices. That is, the latch, generally supported in a forked end of the pin, has to be aligned with the shank of the pin by hand and held with the furcations of the forked end resisting the action of gravity for insertion through the apertured sheets. After insertion the pin is rotated 90° and the latch drops to lock the device; no means to unlock the device for removal is disclosed (See U.S. Pat. No. 2,318,548, W. J. Whitehead et al., May 4, 1943). Another latch locking device, used for trailer hitch coupling pins, utilizes the force of gravity to align the latch with the pin for insertion and removal; however, the latch has to be rotated by hand to the locking position (See U.S. Pat. No. 1,974,966, H. M. McClure, Sept. 25, 1934).

The problem with the prior art devices is that their use of gravity to actuate the locking latch limits use to positions from which gravitational forces can act on the latch, and to structures where the latch is readily accessible for hand operation. Further, although use has been made of a gasket to close the area between the pin and aperture, the seal of known devices has been imperfect. The problem has been to keep the gasket in sealing contact with the duct material after such actions as vibrations.

SUMMARY OF THE INVENTION

It is an object of this invention to provide a joint duct pin having a latch which may be aligned with the body of the pin by a lever for insertion in or removal from a closed area, and after insertion positioned transverse to the pin body by a second lever for locking the pin in the apertured material.

Another object of the invention is to provide a duct joint pin with a resilient ring which is pressed into a sealing engagement with the apertured material by an operator pushing on a flange carrying the resilient O-ring and retained in sealing engagement by moving the latch into the transverse locking position.

A further object of the invention is to provide a duct joint pin meeting the above-mentioned objects, which is efficient in operation; easy to manipulate; and economical to produce.

Briefly stated the pin comprises a latch pivotally mounted to one end of a tubular pin body having a stop flange welded or otherwise suitably attached to the end opposite the latch; a pair of levers having ends for engaging the latch, and shanks passing through the tubular body of the pin and through a coil spring adjacent the pin flange; and heads for retaining the coil spring on the shanks and providing a face for an operator to depress the levers after which the coil spring acts to reposition the levers.

The flange of the tubular pin body carries a resilient O-ring on its face adjacent the apertured duct material. The resilient O-ring is compressed by an operator pushing on the flange to permit locking of the latch by one of the levers, and to seal the area between the duct pin and walls of the aperture. The resilient O-ring is then permitted to partially expand to bring the apertured plates together while maintaining the sealed condition of the aperture.

BRIEF DESCRIPTION OF THE DRAWINGS

FIG. 1 is an exploded view of the duct joining pin showing the elements and their association with each other to accomplish the desired objects of the invention.

FIG. 2 is a side elevation of the device using heavy lines to show the pin in use to join together two apertured duct plates which are shown by dot-and-dash lines, and using dashes to show the latch in position for insertion and removal from the plates.

DESCRIPTION OF THE PREFERRED EMBODIMENT

Referring to the drawings, the duct joint pin construction of the present invention comprises a tubular pin body 10, having a forked end 12, and a flanged end 14. A flanged sleeve 16 having a sealing washer 18 attached to the end of the sleeve opposite the flange is supported in the tubular body 10 by its flange. The sealing ring gasket 18 may be made of rubber or other suitable sealing material.

A latch 20 is pivotally mounted in the furcations of the forked end 12, and operated by a pair of levers 22 and 24. The lever 22 has at one end a shoe 26 for engaging the latch 20 when pivoted into substantial alignment with the body of the pin by lever 24; a semicircular shank 28 passing through the sleeve of the tubular body; and at the end opposite the shoe a semicircular head 30. The lever 24 has a rounded end 32 for engaging the latch when the latch is moved into a transverse locking position with respect to the body of the pin by the lever 22; a semicircular shank 34 having an offset portion supporting the rounded end and a straight portion passing through the sleeve of the tubular body; and at the end opposite the rounded end a semicircular head 36. It will be understood that the semicircular shanks in the combined circular form will lend support one to the other during operation and facilitate sealing the area between the shanks and the tubular pin sleeve by the sealing washer which also acts to retain the shanks in juxtaposition.

The heads preferably are integral parts of their shanks with outer faces adapted to be pushed by the operator, and inner faces having semicircular grooves which coact to form a circular groove 38.

A coil spring 40 surrounds the lever shanks and has one end positioned in the circular groove 38 of the heads and the other end abutting the flange of the pin flanged sleeve 16. The spring 40 is used to reposition the levers after use to manipulate the pin latch.

A resilient sealing O-ring 42, made of rubber or other suitable material, is carried on the side of the pin flange 14 adjacent the apertured duct material. The resiliency of the O-ring is utilized in the operation of the device to seal the area defined by the pin and the walls of the apertured duct material and to permit pivoting of the latch to the locked position and thereafter to retain the latch in the locked position.

In operation the latch, prior to insertion, is brought into near alignment with the body of the pin by compressing lever 24. The pin is then inserted into the apertured plates 44 and 46 and flange 14 pressed inwardly to compress the resilient O-ring to permit the latch to clear the apertured plates. Lever 22 is then compressed to drive the latch into a transverse locking position with respect to the body of the pin. The pressure on the flange 14 of the pin is released and the resilient O-ring expands to bring the latch in contact with the apertured duct material to clamp it together. The latch 20 then coacts with the flange 14 to stop the expansion of the resilient O-ring and maintain a sealing pressure for the O-ring to seal the area between the pin and the aperture walls of the duct sheets. The sealing washer 18 completes the sealing of the aperture of the duct sheets by pressing the lever shanks together and filling the area between the shanks and the tubular body of the pin.

I claim:

1. A device for joining together juxtaposed apertured duct members or the like, which comprises:
    a. a tubular pin for insertion through two or more juxtaposed apertured duct members;
    b. a stop member carried by the pin and adapted to engage one of the apertured duct members to limit amount of insertion;
    c. a pin locking means carried by the pin opposite the stop member and adapted to pass through the apertured duct members; and d. dual operator means for locking and unlocking the pin locking means for retention and withdrawal of the pin;

the pin locking means and means for locking and unlocking the locking means comprising:

a. an elongated latch pivotally mounted on the end of the pin opposite the stop member of the pin, the latch being mounted nearer one of its ends than the other to define longer and shorter ends thereof;

b. biasing means normally retaining the latch in the locked position;

c. a first unitary lever having one end for engaging the shorter end of the latch when it is in substantial alignment with the pin, a shank passing through the tubular pin, and an exterior end which constitutes a rest for manipulating the lever;

d. a second unitary lever being axially longer than the first lever and having an end for engaging the longer end of the latch when it is in a position transverse to the pin, a shank passing through the tubular pin, and an exterior end forming a rest for the operator's hand when manipulating the lever; and e. means normally biasing the first and second levers away from the latch;

Whereby the latch after insertion through the apertured duct members may be urged to a position transverse the pin by the first lever, and thereafter can be substantially aligned with the pin by the second lever for removal.